(12) United States Patent
Huang et al.

(10) Patent No.: US 7,003,200 B2
(45) Date of Patent: Feb. 21, 2006

(54) PM FIBER ALIGNMENT

(75) Inventors: Wei-Ping Huang, Spanga (SE); David Wallin, Bromma (SE); Peter Lindskog, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 10/502,421

(22) PCT Filed: Feb. 26, 2003

(86) PCT No.: PCT/SE03/00324

§ 371 (c)(1),
(2), (4) Date: Mar. 28, 2005

(87) PCT Pub. No.: WO03/073143

PCT Pub. Date: Sep. 4, 2003

(65) Prior Publication Data
US 2005/0254754 A1    Nov. 17, 2005

(30) Foreign Application Priority Data
Feb. 26, 2002  (SE)  .................... 0200569

(51) Int. Cl.
*G02B 6/26* (2006.01)
*G01B 11/00* (2006.01)

(52) U.S. Cl. .................. 385/52; 385/11; 385/15; 356/508

(58) Field of Classification Search .......... 385/11, 385/15, 27, 39, 52; 356/508

See application file for complete search history.

(56) References Cited

U.S. PATENT DOCUMENTS
5,024,501 A * 6/1991 Taya et al. ............. 385/11

(Continued)

FOREIGN PATENT DOCUMENTS
EP    0774678 A1    5/1997

(Continued)

OTHER PUBLICATIONS

Swedish Patent Office, International Search Report for PCT/SE03/00324, dated May 7, 2003.

*Primary Examiner*—John D. Lee
(74) *Attorney, Agent, or Firm*—Roger Burleigh (57) ABSTRACT

The polarization axes of the ends of two PM fibers are aligned in an automatic fiber splicer by first making a linear alignment of the fiber ends (1, 1') using movable retainers (21) the same way as for conventional splicing. The fiber ends are rotated by rotatable fixtures (22) to capture images by a camera (9) and therefrom, in an image processing and analysis unit (15), as controlled by logical circuits (33) light contrast profiles are determined as functions of the angular position. From the light contrast profiles the polarization axes are determined and then they are aligned with each other. The images are captured of an area at and around the fiber ends as seen in an observation plane. This observation plane is taken to have such a position that the variation of the light contrast profiles is sufficiently large, this making the determination of the angular positions of the polarization axes have a sufficient accuracy, also for for example elliptical core fibers.

9 Claims, 7 Drawing Sheets

U.S. PATENT DOCUMENTS

| | | | | |
|---|---|---|---|---|
| 5,572,313 A | * | 11/1996 | Zheng et al. | 356/73.1 |
| 5,758,000 A | * | 5/1998 | Zheng | 385/97 |
| 5,850,283 A | * | 12/1998 | Zheng | 356/73.1 |
| 6,628,406 B1 | * | 9/2003 | Kreuzer | 356/508 |
| 6,809,827 B1 | * | 10/2004 | Kreuzer | 356/508 |
| 2005/0041256 A1 | * | 2/2005 | Kreuzer | 356/508 |

FOREIGN PATENT DOCUMENTS

| | | |
|---|---|---|
| EP | 0819958 A1 | 1/1998 |
| WO | WO 9514945 A1 | 6/1995 |

* cited by examiner

PM FIBER ALIGNMENT

RELATED APPLICATIONS

This application claims priority and benefit from Swedish patent application No. 0200569-2, filed Feb. 26, 2002, the entire teachings of which are incorporated herein by reference.

FIELD OF THE INVENTION

The present invention relates to alignment of the fast and slow optical axes of the ends of two polarization maintaining (PM) fibers to be fusion spliced to each other, in particular to alignment of elliptical core fibers having a relatively weak ellipticity.

BACKGROUND

Before splicing two optical fibers to each other, a proper mutual alignment of the fibers is essential, since this will minimize the optical attenuation for light propagating in the fibers and through the splice. In the particular case of aligning two PM fibers to each other, special consideration of the geometry of the fibers has to be made. Like conventional fibers, commercially available PM fibers have a core region and a surrounding cladding, the cladding having generally a circular-cylindrical outer surface. However, the distribution of the refractive index over a cross-section perpendicular to the longitudinal axis of PM fibers is not circular-symmetric with respect to the fiber axis unlike the conventional case.

For splicing PM fibers to each other an important issue is therefore to achieve a good angular alignment or azimuthal alignment, so that, for two PM fibers, regions of equivalent refractive indices are as close as possible to each other at the two opposite fiber end faces, located closely at each other, at which the fibers are to be spliced to each other. Two basic methods are frequently used for the angular alignment, the so-called active and passive alignment methods. For the active alignment method, a highly polarized light source, a polarization extinction ratio (PER) meter and an apparatus provided with optical fiber rotators are needed. The PER is defined as the optical power ratio in dB form measured along two main optical axes. The angular alignment can be achieved by maximizing the value of PER while rotating one fiber end with respect to the other at the splicing point. A typical apparatus using the active method for angular alignment of PM fibers was disclosed in 1992, see U.S. Pat. No. 5,156,663, Oct. 20, 1992, for Keinichiro Itoh et al.

The passive alignment method is performed locally at the splice point with the assistance of digital imaging techniques in an automated fusion splicer. Several different techniques have been developed for passively aligning PM fibers. A method using an interference pattern to determine the polarization axes of PM fibers was disclosed in 1994, see U.S. Pat. No. 5,323,225, Jun. 21, 1994, for Richard B. Dyott et al. A method using the photoelastic effect to determine the polarization axes of PM fibers was disclosed in 1995, see U.S. Pat. No. 5,417,733, May 23, 1995, for Laurence N. Wesson. Methods of intensity profile analysis have also been proposed, e.g. the fiber side-view method, see H. Taya, K. Ito, T. Yamada and M. Yoshinuma, "New splicing method for polarization maintaining single mode fibers," Conf. on Optical Fiber Communication (OFC'89), THJ2, 1989, and H. Taya, K. Ito, T. Yamada and M. Yoshinuma, "Fusion splicer for polarization maintaining single mode fiber", Fujikura Technical Review, pp. 31–36, 1990, and the fiber end-view method, see U.S. Pat. No. 5,147,434, Sep. 15, 1992, for K. Itoh, T. Yamada, T. Onodera, M. Yoshinuma and Y. Kato, "Apparatus for fusion splicing a pair of polarization maintaining optical fibers", and U.S. Pat. No. 5,156,663, Oct. 20, 1992, for K. Itoh, T. Yamada, T. Onodera, M. Yoshinuma and Y. Kato, "Apparatus for fusion splicing a pair of polarization maintaining optical fibers". More advanced techniques, see Wenxin Zheng, "Automated Fusion-Splicing of Polarization Maintaining Fibers", IEEE J. Lightwave Tech., Vol. 15, No. 1, 1997, e.g. the combination of the polarization observation by lens effect tracing (POL)-profile with the method of POL-correlation for directly and indirectly determining the angular offset of PM fibers, have also been disclosed, see Swedish Patent No. 9300522-1, March, 1993, inventors Wenxin Zheng et al., U.S. Pat. No. 5,572,313, Nov. 5, 1996, for Wenxin Zheng et al., U.S. Pat. No. 5,758,000, May 26, 1998, for Wenxin Zheng et al., and the published International Patent application No. WO 01/8633 for Wei-Ping Huang et al. These techniques were very successfully employed in automated arc fusion splicers for the most common PM fibers then available in the market, e.g. the Panda and the Bowtie fibers.

Recently, elliptical-core fibers have attracted great interest in construction of communication systems, e.g. in constructing erbium-doped PM fiber amplifiers and optical fiber sensors. Unfortunately, the existing alignment techniques, see the above-cited patents on POL-profile methods, can hardly generate stable and consistent results of angular alignment for the elliptical-core type due to primary technical limitations. For example, the methods are not sensitive enough to accurately measure the small variations in the intensity profiles when rotating the fibers. Thus, there is a need in the art to improve the existing alignment techniques, in particular those based on the POL-profile, in order to be capable of handling all types of PM fibers.

In particular, these problems appear in illuminating each fiber from a side thereof and regarding the fiber as a cylindrical lens, observing the light intensity variations in the focal plane along a line perpendicular both to the longitudinal axis of the fiber and to the propagation direction of the illuminating light source. Typically, the intensity has a central peak that varies in height when the fiber is rotated about its longitudinal axis, see the Swedish Patent No. 9300522-1 and the published International Patent application No. WO 01/8633 cited above. In this context it is interesting to calculate the light contrast, h, which is the difference in intensity between the central peak and the surrounding region. The profile of the light contrast is obtained as the variation of the light contrast as a function of the angle of rotation, i.e. the azimuthal angle.

A highest possible contrast of h-values, i.e. of the difference between the maximum and the minimum h values in the profile of the light contrast, is essential to ensure a high quality of the contrast profile. It turns out that, for PM fibers of elliptical core type the contrast of the h-values is usually less than 10 grey scale levels as measured in a typical automated fusion splicer. Thus in this case, the light contrast profile becomes extremely sensitive to the adjustment of the optical image system of the splicer used.

SUMMARY

It is an object of the invention to provide a method and a device for improving the quality of the optical measurement of h values for PM fibers and in particular of the contrast in measured POL-profiles.

Thus generally, a careful adjustment of the plane in which the contrast is observed, i.e. of the focal plane, is made.

The adjustment of said plane is done on observing the light intensity variations in the plane in order to achieve a sharpest or highest possible contrast. This sharper contrast results in a much better estimation of the angular position of the principal optical axes of PM fibers using the POL method, this estimation method being suited to align PM fibers of all types, especially PM fibers having elliptical cores.

A solution to the above problem may thus be achieved by observing that the focal distance of a PM fiber illuminated from the side thereof varies slightly according to the asymmetry in optical transparency that appears during rotation of the fiber about the longitudinal axis thereof. A "best match plane", in which the highest contrast of h-values can be obtained, should generally result when the observation plane matches the focal plane, and in particular for angular positions of the considered fiber for which the slow optical axis of the fiber also is approximately oriented along the propagation direction of the illuminating light-rays and the optical axis of the image system, this direction and the axis being assumed to be parallel to each other. It is found that the accepted error in determining the position of the best match plane along the light-ray direction depends strongly on the PM fiber considered. For PM fibers having elliptical cores, the acceptable position error is typically only a few $\mu$m.

The method proposed herein improves the processes disclosed in Swedish Patent No. 9300522-1 and the published International Patent application No. WO 01/8633 cited above, by employing a so called "auto-defocusing" method to automatically search for the best match plane. The advantage of such a process is that it yields a better precision in aligning PM fibers having elliptical cores for optimum positions during e.g. a fusion splicing procedure.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in, the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1A:
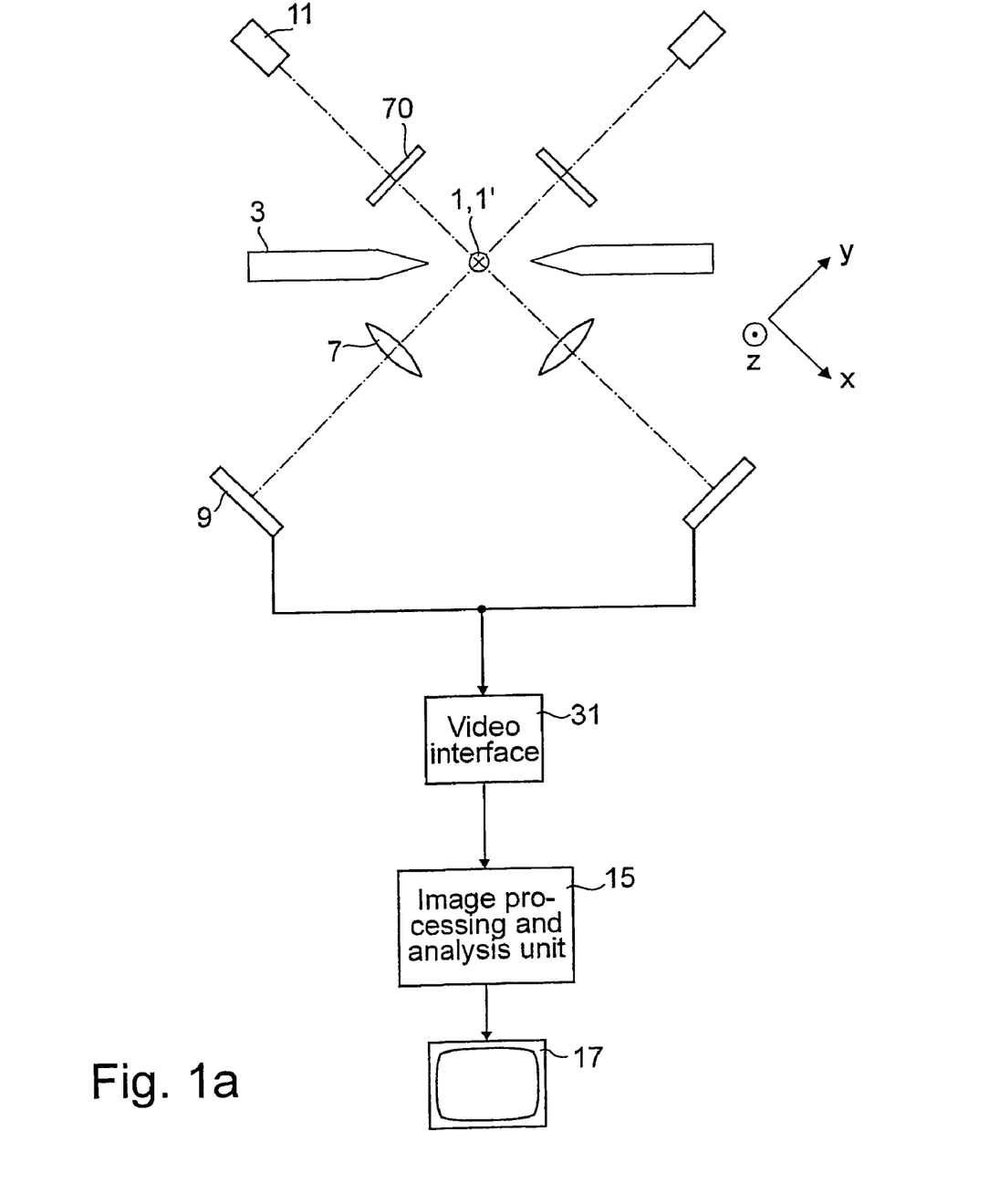
FIGS. 1a, b are schematic views of an apparatus for alignment of two PM fibers.
Figure 1B:
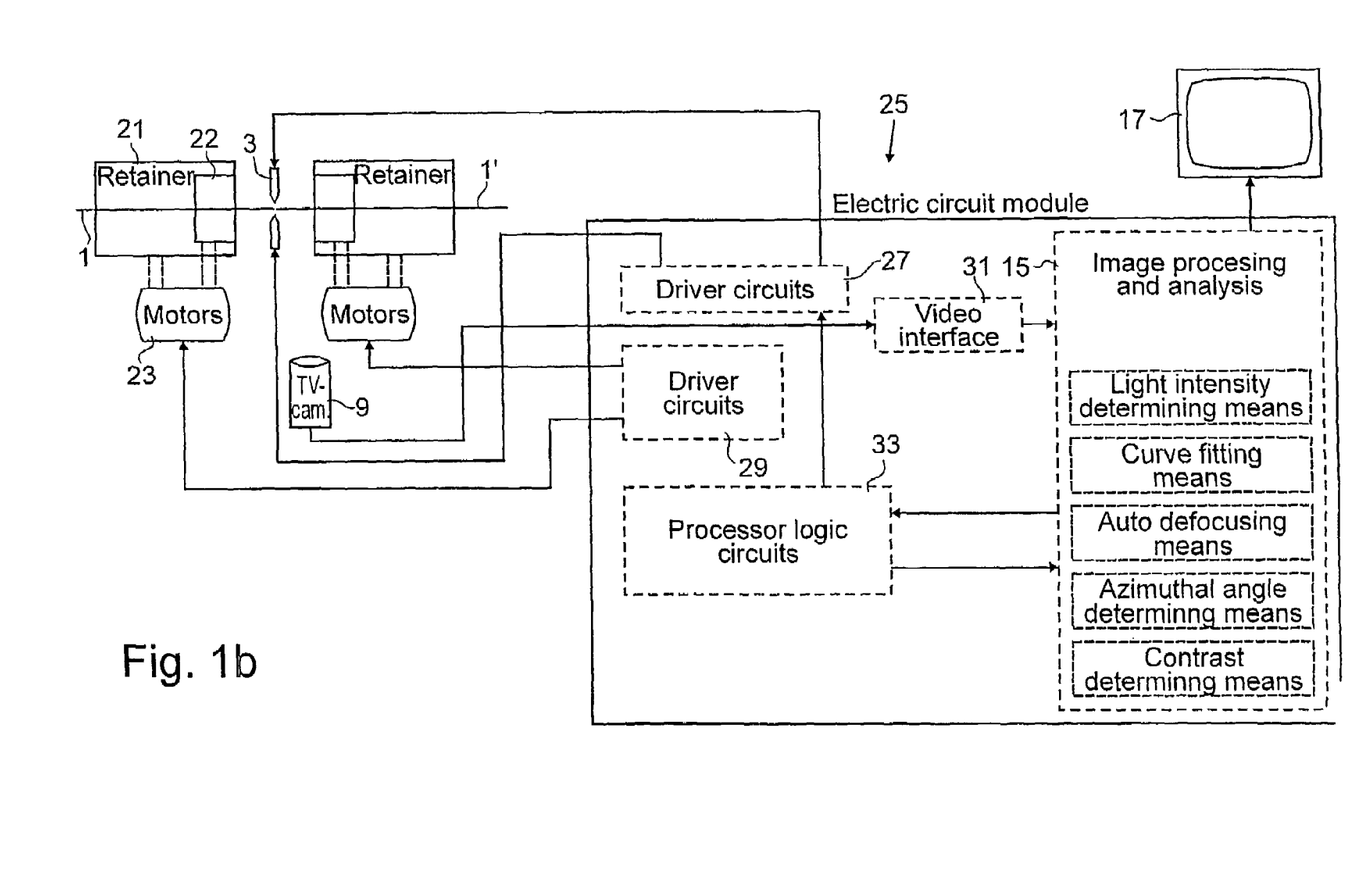

The basic components of an automatic optical fiber splicer adapted for splicing PM fibers are shown in the schematic diagrams of FIGS. 1a and 1b. FIG. 1a is a schematic of the optical arrangement near the ends of two PM fibers 1 and 1', which are to be fusion spliced to each other using an electrical discharge between points of two electrodes 3. Two light sources 11 illuminate the splice position of the fibers from the sides thereof by parallel light rays in two perpendicular directions. Since an optical fiber itself works as a cylindrical lens, a varying light intensity distribution appears in the focal plane of the fiber, as for instance observed along a line located in the focal plane and located perpendicularly to the longitudinal axis of the optical fiber. By using suitable focusing assemblies illustrated by optical lenses 7, four light intensity distributions, as taken in the object planes of the lens assemblies, one for each fiber end and for each direction, are in turn imaged onto the light sensitive surfaces of TV cameras 9, comprising e.g. plates carrying CCD elements. Each picture captured by the cameras thus comprises images of the ends of the two PM fibers at the splicing position. The TV signals corresponding to each captured picture are then processed in a video interface 31 to convert the intensity values of the pictures to a suitable format for further processing in an image processing and analysis unit 15 and subsequent presentation on a video monitor 17.

In FIG. 1b some more details of the mechanical and electrical arrangements of the fiber splicer are shown. The end portions of the PM fibers 1 and 1' are thus firmly kept in place by rotating fixtures 22 carried by retainers 21 during the alignment and splicing operations. By motors 23, the retainers 21 are displaceable in three orthogonal directions, x, y and z, the z-direction e.g. being taken to be parallel to the longitudinal direction of the fiber ends, see FIG. 1a, and the rotating fixtures are rotatable over an angle of 360°. To the electrodes 3 and the motors 23 electric lines extend from driver circuits 27 and 29, respectively, in an electric circuit module 25. The TV camera 9 is electrically connected to a video interface 31 in the electric circuit module 25 that is in turn connected to the image processing and analysis unit 15 for delivering captured image information. The various steps for the processing of input data are controlled by a processor logic circuit 33 in the electric circuit module 25 providing control signals to the driving circuits 27 and 29 in accordance with output data of the image processing and analysis unit 15. That is, as the result of a particular analysis of the distribution of light intensity in the focal planes of the PM fibers 1 and 1', the fiber ends are displaced in relation to each other according to given processing algorithms. At the same time information is by the processor logic circuits 33 provided to the image processing and analysis unit 15 for controlling the processing and analysis performed therein. Also, the processor logic unit 33 controls the times when an electric high voltage is to be provided to the electrodes 3, thus starting an electric current to flow in the discharge between the points of the electrodes, and it also controls the duration of this current and the intensity of the current. The processor logic unit 33 also controls the illumination of the light sources 11.

Figure 2:
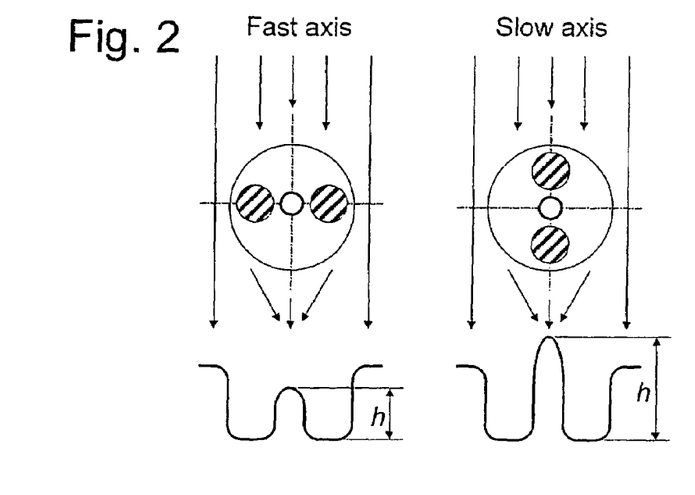
FIG. 2 is a schematic diagram showing the significant difference in light contrast h for two orientations of a Panda fiber.

From the images captured by the TV cameras 9 the light intensity distributions along suitably chosen lines perpendicular to the longitudinal direction of the ends of the fibers 1, 1' in the focal planes of fibers 1 and 1' are determined by the image processing and analysis unit 15. From these determined intensity distributions the light contrast h for each line is calculated by the image processing and analysis unit 15 as the difference between the maximum intensity in the central peak of the respective distribution, this peak corresponding to the longitudinal center line of the image of the fiber ends, and the relatively constant light intensity of regions of the distribution located next to and on the two sides of the peak. It is observed that the h-value varies when rotating the respective fiber end about the longitudinal axis thereof. The variation results from the optical asymmetry of PM fibers such as stress zones and/or refractive index differences that have been introduced in the cladding and/or core of such fibers. The lack of optical symmetry results in a significant difference in h-value from one azimuthal angle or angular position to another one. The h-value can thereby indicate the position of the optical asymmetries of the fiber end. The h-values determined from the corresponding intensity distributions when rotating the PM fiber ends, e.g. over a full turn, give a light contrast profile as a function of the angular position from which it may be possible to determine the angular orientation of the optical asymmetries and therefrom the polarization axes of the respective end of a PM fiber. FIG. 2 illustrates significantly different h-values obtained for a Panda PM fiber at two unique orientations, i.e. along the slow and fast optical polarization axes, respectively.

Figure 3:
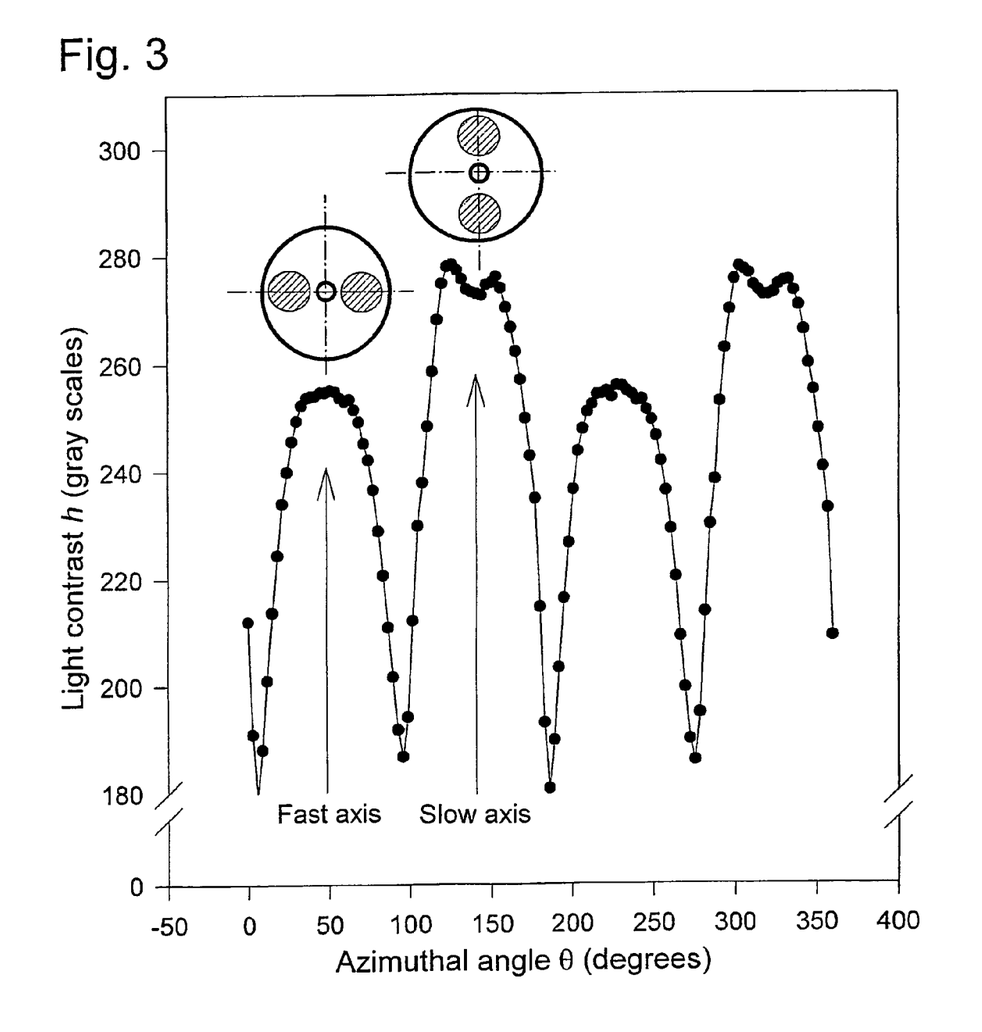
FIG. 3 is a diagram showing a typical light contrast profile obtained for a Panda fiber.
Figure 4:
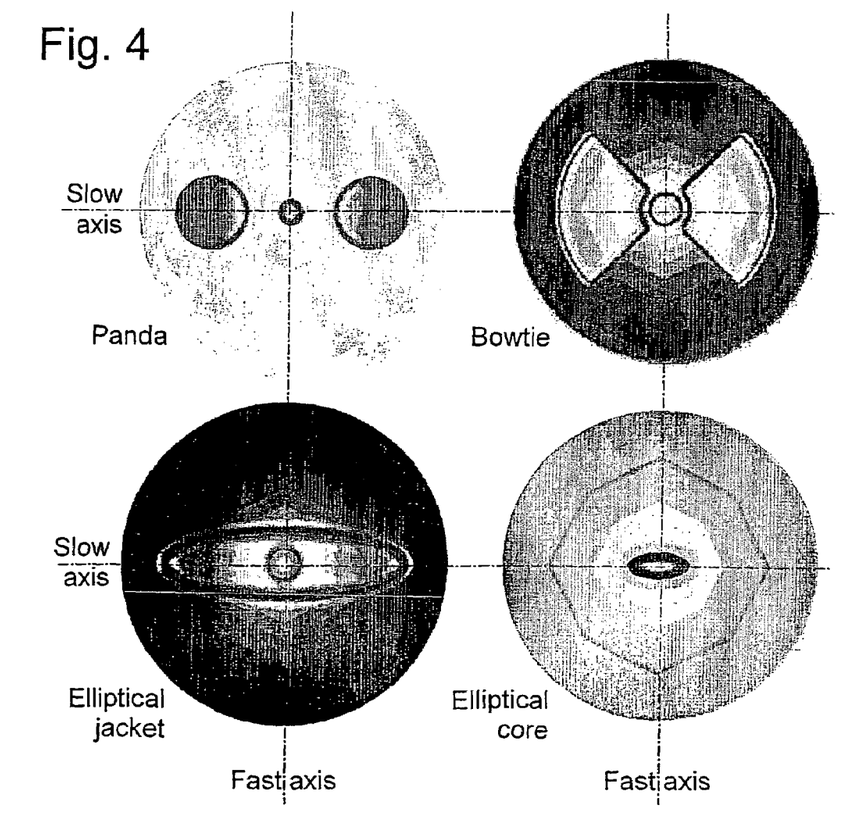
FIG. 4 is a schematic view of major types of PM fibers, in which the principal optical axes for the fibers are marked correspondingly.

FIG. 3 is a diagram showing a light contrast profile measured for a typical Panda PM fiber, i.e. the h-values as a function of the rotation angle. It is observed that a two-peak structure appears periodically in the profile. The periodicity is directly correlated to the symmetry of the fiber with respect to the longitudinal axis of the fiber. The main peaks in the profile indicate the angular position of the two optical polarization axes, i.e. the fast and the slow axis, of the fiber end. The center position of the highest peak in the profile directly indicates the angular position of the slow axis of the considered PM fiber. This results from the fact that the light contrast gradually increases with decreasing angular offset between the propagation direction of light rays and the slow optical axis. This phenomenon is true for PM fibers of most types, e.g. Panda and Bowtie fibers and PM fibers having elliptical jackets or elliptical cores. The principal optical axes for these PM fibers are shown in the cross-sectional views of FIG. 4.

The angular orientation of the polarization axes of PM fibers can be determined as the positions of the slow optical axes, as given by profile analysis described above, in relation to some arbitrary zero value of the azimuthal or rotation angle. The zero value may be selected to be e.g. the initial calibration or zero position of the fiber rotary fixtures 22. The angular positions of the fast optical axes are then 90° away from the angular positions of the slow optical axes.

From a close inspection of FIG. 3, a detailed structure is seen in the highest peak. This structure can mainly be attributed to the influence of the fiber core on the light transmission across the stress zones, at a somewhat small range around the angular position of the considered fiber end in which the slow optical axis is parallel to the direction of observation. Therefore, it is necessary to select a suitable method modelling the light contrast profile and extracting more detailed information from the profile so that the position of the slow optical axis can be accurately determined.

Figure 5:
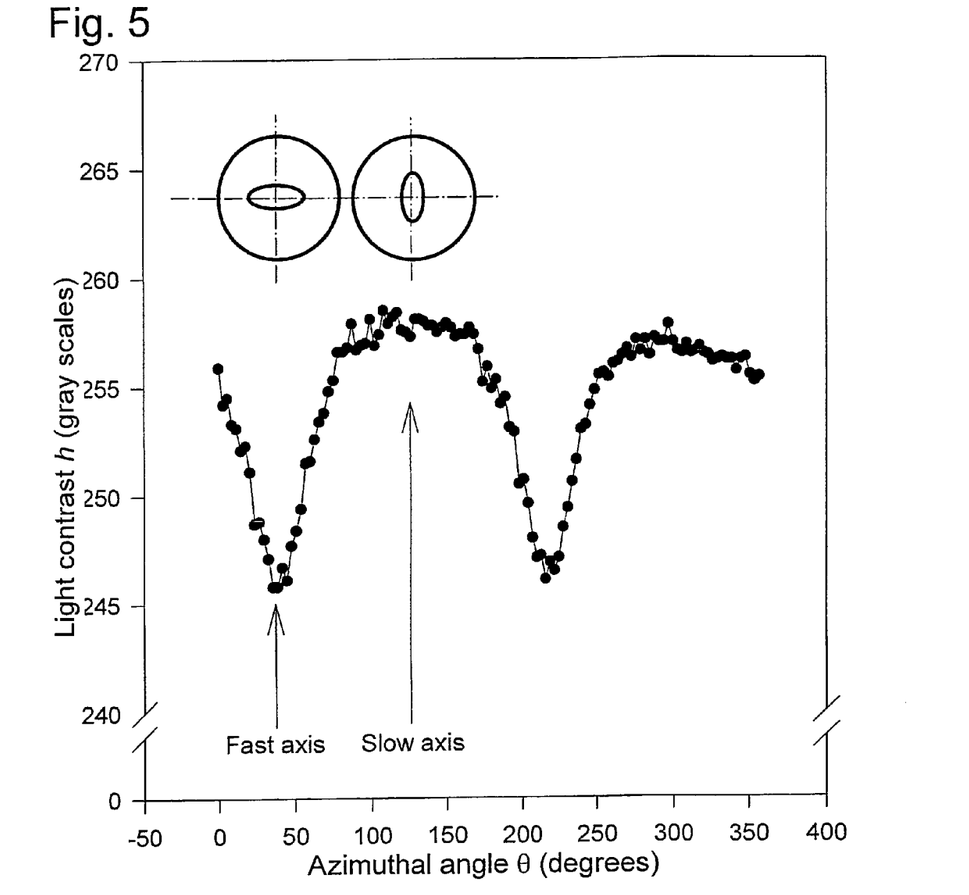
FIG. 5 is a diagram showing a typical light contrast profile obtained for a PM fiber having an elliptical core.

In the diagram of FIG. 5 a typical light contrast profile measured for a PM fiber having an elliptical core is plotted. Significant differences between this profile and that measured for the Panda fiber, see FIG. 3, can be observed. First, for a PM fiber having an elliptical core, only one peak periodically appears in the profile, this peak indicating the slow optical axis of the fiber. Second, the range of the h-values is one order of magnitude smaller, actually around 10 grey scale levels in the case of PM fibers having an elliptical core as measured in a typical automatic fiber splicer, compared to that obtained for the Panda fiber which is around 100 grey scale levels. This small range results from the fact that the difference in length between the major and minor elliptical axes of the core in PM fibers having an elliptical core is very small, only 1–2 $\mu$m in a typical case. It is obvious from general experience in the field of measurements that a profile having a low variation range will often give a low accuracy of the determined angular positions of the polarization axes and thereby a low quality of the angular alignment that is based on the determined angular positions. Therefore, special techniques, like "auto-defocusing" to be described hereinafter, have to be employed to overcome this problem.

For the angular alignment of two PM fiber ends, general steps can be performed as follows: select a well-defined sampling range of angles, typically 360°, in which the light intensity distribution is measured and therefrom calculate light contrast profiles for the two PM fiber ends, find the slow optical axes by a careful analysis of obtained profiles, and align the slow axes of the two PM fiber ends with each other. For the numerical calculations necessary in executing the method, it may be assumed that the total number N of measured points for construction of the light contrast profiles of the two fibers can be represented by two vectors, $\{\Theta_A, \Theta_B\}$ respectively:

$$\Theta_A = \{\theta_{a\ 0}, \theta_{a\ 1}, \theta_{a\ 2}, \ldots, \theta_{a\ axis}, \ldots, \theta_{a\ N-1}\} \quad (1)$$

$$\Theta_B = \{\theta_{b\ 0}, \theta_{b\ 1}, \theta_{b\ 2}, \ldots, \theta_{b\ axis}, \ldots, \theta_{b\ N-1}\} \quad (2)$$

where $\theta_{a\ 0}$ and $\theta_{b\ 0}$ are the initial azimuthal angles with respect to the zero values. If the basically arbitrary, initial positions of the fiber rotators 22 are selected as the zero values, $\theta_{a\ 0} = \theta_{b\ 0} = 0°$. $\theta_{a,\ axis}$ and $\theta_{b,\ axis}$ are the azimuthal angles where the slow optical axes are located, i.e. at these angles the slow optical axes are parallel with the respective observation direction which is in the optical axis of the respective lens assembly 7. Thus, the angular offset $\Delta\Theta$ between the polarization axes of the two fiber ends is given by:

$$\Delta\Theta = |\theta_{a\ axis} - \theta_{b\ axis}| \quad (3)$$

It should be observed that neither of the true values $\theta_{a\ axis}$ nor $\theta_{b\ axis}$ normally is an angle at which a light intensity distribution is measured but these angular position are usually located between two angular positions at which measurements are made, the measurements being made for angles having a finite, constant spacing. The accuracy in the determination of the angles $\theta_{a\ axis}$ and $\theta_{b\ axis}$ mainly depends on the short range variation of light contrast profiles, the selection of the model used in the evaluations, as will be described hereinafter, and the quality of the mechanical rotators 22 used. Although the accuracy of angular alignment of the polarization axes is not directly determined by the number N of measured values, it is preferable to take a relatively large number of N, typically 90–180 points within a range of 0–180° or of 0–360°, depending on the symmetry of the fibers and requirements on the resolution of the profile.

After the fusion splicing has been carried out, the remaining angular offset $\Delta\vartheta$ between the two slow axes of the two PM fiber ends can be found by detecting the slow axes using the same method as discussed above, rotating the two spliced fiber ends as one unit. The offset $\Delta\vartheta$ can be used to estimate the degradation of polarization extinction ratio, PER, due to the splicing operation. This degradation is denoted by $\Delta\Gamma$ and is given by:

$$\Delta\Gamma = \Gamma_{before} - \Gamma_{after} \quad (4)$$

$$\Gamma_{after} = 10 \log\{(1+\rho \cos 2\Delta\vartheta)/(1-\rho \cos 2\Delta\vartheta)\} \quad (5)$$

$$\rho = (10^{\Gamma_{before}/10} - 1)/(10^{\Gamma_{before}/10} + 1) \quad (6)$$

where $\Gamma_{before}$ and $\Gamma_{after}$ are the PERs just before and just after the splicing operation has taken place, respectively. The $\Gamma_{before}$ and $\Gamma_{after}$ are usually obtained from the measured PER of a highly polarized light source, taken at the far ends of the first fiber 1 and the second fiber 1', respectively. In equations (5) and (6) it is also assumed that a short piece of the second fiber 1', typically 2 meters in length, should be used to perform measurements of $\Gamma_{after}$ so that the degradation of PER caused by the splice can be isolated.

In order to accurately determine the location of the slow optical axis from the light contrast profile a curve fitting process, a so-called Chi-Square ($\chi^2$) fitting, can be used. Within the frame of this method, it should be possible to model the measured profile by the superposition of analytic functions plus a noise background. Thus, the quality of curve fitting can be evaluated by a reduced Chi-Square ($\chi^2$) function. The reduced $\chi^2$ function can be expressed by:

$$\chi^2 = \frac{1}{N-\mu} \sum_{i=1}^{N} \left( \frac{F(\vartheta_i) - \sum_{j=1}^{n} G(\vartheta_i; a_{1,j}, a_{2,j}, a_{3,j}...) - C}{\Delta F_i} \right)^2 \quad (7)$$

where $G(\vartheta_i; a_{1j}, a_{2j}, a_{3j}, \ldots)$ is an analytic function with the j-th fitting parameters $a_{1j}, a_{2j}, a_{3j}, \ldots$ and $F(\vartheta_i)$ is the average of the i-th measured h-value at the azimuthal angle $\vartheta_i$ with a measurement error-bar $\Delta F_i$. Here, the $\Delta F_i$ is estimated by the standard deviation: $\Delta F_i \approx$ $$\sqrt{\frac{1}{M} \sum_{i=1}^{M} [F(\vartheta_i) - F_l(\vartheta_i)]^2},$$

where $F_l(\vartheta_i)$ is the l-th individually measured h-value of the total values of M unities, at the angle $\vartheta_i$ and N is the total number of h-values, or the total number of measurement points in azimuth. C is a constant value that represents the noise background of the imaging system. $\mu$ is the number of fitting parameters varied during the fitting procedure and n is the number of independent analytic functions used in the fitting procedure.

In the profile analysis, it turns out that a single Gaussian function can be a suitable analytic function for modelling the highest peak where the slow optical axis is located. Thus, the equation (7) can be reduced to:

$$\chi^2 = \frac{1}{N-\mu} \sum_{i=1}^{N} \left( \frac{F(\vartheta_i) - G(\vartheta_i; a_1, a_2, a_3) - C}{\Delta F_i} \right)^2 \quad (8)$$

where $G(\vartheta_i; a_1, a_2, a_3)$ is the Gaussian function with fitting parameters $a_1$, $a_2$ and $a_3$. The parameter $a_1$ stands for the height of the function, and the parameters $a_2$ and $a_3$ stand for the expected center position of the highest peak in the profile and the full width to half maximum (FWHM) of the peak, respectively. The best set of fitting parameters $\{a_{1,best}, a_{2,best}, a_{3,best}, C\}$ is the one that maximizes the probability of the Gaussian function representing the measured data of the function $F(\vartheta_i)$. Practically, the parameters $\{a_{1,best}, a_{2,best}, a_{3,best}, C\}$ are input to a numerical iteration loop in which $\chi^2$ is calculated. To succeed in the fitting process the parameters are then changed in a systematic way in order to achieve a desired result of $\chi^2 \approx 1$. Thus, the position of the slow optical axis will be given by $a_{2,best}$. The initial values $\{a_{1,0}, a_{2,0}, a_{3,0}, C\}$ for fitting are determined by a pre-analysis of the height profiles, and e.g. $a_{1,0} = \text{Max}[F(\vartheta_i)]$, $a_{2,0} = \vartheta_i\{\text{Max}[F(\vartheta_i)]\}$, $a_{3,0} = 2|a_{2,0} - \vartheta_k\{\text{Max}[F(\vartheta_i)]/2\}|$, $C = \text{Min}[F(\vartheta_i)]$ can be chosen.

According to basic mathematics, the light contrast profile can in principle be represented by any set of elementary functions, e.g. polynomial and rational functions, logarithmic, exponential, power and hyperbolic functions, trigonometric and inverse trigonometric functions, etc. The selection of the analytic functions depends mainly on the requirements on the alignment accuracy and the time for executing the necessary calculations. These requirements may vary depending on the type of PM fiber considered. One typical example is a truncated Fourier series that was successfully used for modelling the POL-profiles of Panda and Bowtie types of PM-fibers, see Wenxin Zheng, "Automated Fusion-Splicing of Polarization Maintaining Fibers", IEEE J. Lightwave Tech., Vol. 15, No. 1, 1997.

Figure 6:
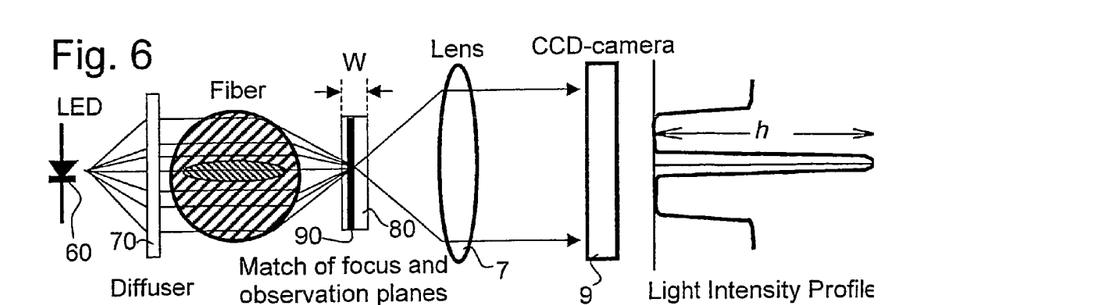
FIG. 6 is a schematic view of an optical imaging apparatus for searching the best match plane in an auto-defocusing application, FIGS. 7a, b are images taken from two defocusing directions, some tens of $\mu$m away on either side of a reference plane.

As is derived from the discussion above, a largest possible range of variation of the h-values is essential to ensure a high quality of light contrast profile and thereby a high accuracy of the angular alignment of the polarization axes. Unfortunately, as has been mentioned above, for PM fibers having elliptical cores, the variation range of the h-values is usually less than 10 grey scale levels as measured in a typical automated fusion splicer. This makes the profile and in particular calculations based thereon extremely sensitive to the adjustment of the optical image system. In FIG. 6 a typical optical image system used for alignment in an automated arc fusion splicer is schematically illustrated. In this case, the fiber is illuminated by a light emitting diode (LED) 60. A diffuser 70 is installed in front of the LED to improve the illumination. From the diffused light a sharp light intensity distribution is formed in a focal plane of the fiber end 1, 1' for a given azimuthal angle. However, due to the changing optical transmission transversely through the fiber end during azimuthal rotation thereof, the position of the focal plane varies. Thus, "an effective focal plane" 80 having a certain width W, indicated by a grey field in FIG. 6, is formed. On the other hand, the observation plane 90 of the optical image system, indicated by the thick black line in FIG. 6, is usually very sharp, i.e. has a very small depth or thickness, due to the high quality of the optical system symbolized by the lens 7. It can be realized that the best observation plane for the purpose of determining an accurate value of the location of the slow and fast axes of a PM fiber should result when the observation plane approximately coincides with the focal plane obtained when the slow optical axis of the considered fiber is oriented in the propagation direction of the illuminating light rays and parallel to the optical axis of the imaging system 7, see FIG. 6. For this orientation, the slow optical axis can obviously be resolved in a best way and the largest variation range of the h-values can be accordingly obtained. Thus, for such a setting the best quality of the light contrast profile for determining the desired angles is obtained. It is found that the accepted mismatch distance in terms of the position of the best observation plane depends strongly on the type of PM fiber considered. For PM fibers of the type having an elliptical core, the accepted mismatch distance is typically only a few $\mu$m.

An "auto-defocusing" process will now be described that aims at automatically searching for the best observation plane. This process can be divided into five steps: (1) finding an approximate angular orientation of the slow optical axes for the two fiber ends which are to be fusion spliced to each other and aligning these axes with each other based on the findings, (2) finding a reference position of the optical system for starting the process of defocusing, (3) determining the direction for defocusing, (4) searching for the best observation plane, and (5) finding an improved orientation of the slow optical axis for each of the two fibers.

The step (1) is straightforward and makes use of the numerical process discussed above. For step (2), a reference position of the optical or imaging system for the defocusing process can be taken to be the position or setting of the optical system having an observation plane 90 for which a sharp image of the fiber cladding sides is obtained as viewed in the direction of the optical axis of the imaging system 7 since the position of such an observation plane at the sides is nearly independent of the actual fiber type for fibers having the same cladding diameter. Alternatively, the reference position can be taken to be the position in which the central part of the light intensity-distribution, corresponding to the center of the image of the fiber end and the area next around it, is sharply imaged on the light sensitive area of the camera 9. This position also varies only slightly for fibers of different types. In performing step (3), a special procedure of image analysis is executed as will be described hereinafter.

Figure 7A:
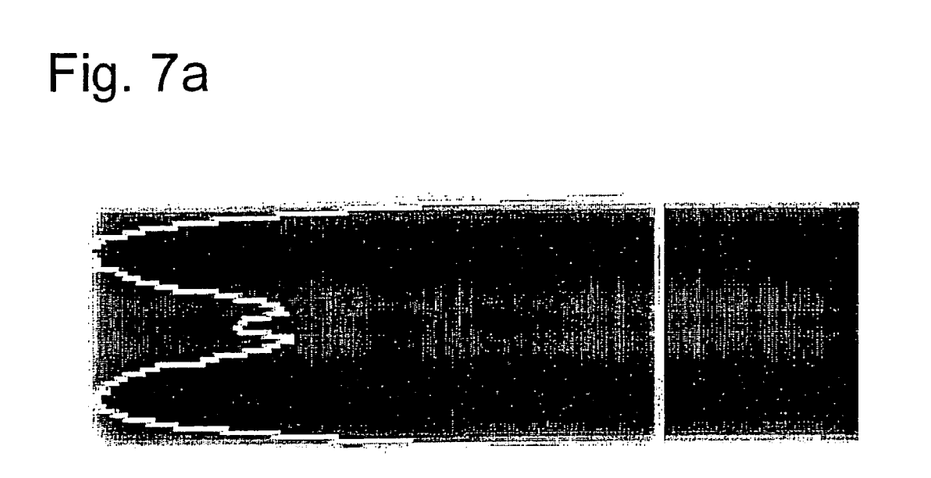
Figure 7B:
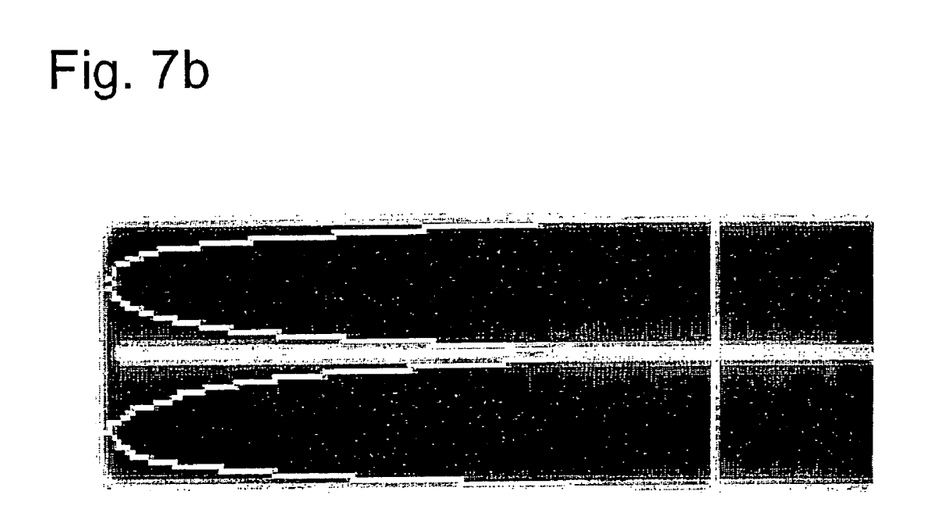

In FIGS. 7a and 7b two images are shown which are taken for the observation plane moved in the two opposite defocusing directions, to positions some tens of $\mu$m away from the reference position, corresponding to moving the observation plane to the right side as seen in FIG. 7a, i.e. closer to the imaging system 7, and to the left side, i.e. farther away from the imaging system as seen in FIG. 7b, with respect to the effective focal plane or region 80 indicated in FIG. 6. The light intensity distributions, shown by white lines, obtained from the images are seen to be significantly different for the two defocusing directions. Furthermore, it is observed that a best observation plane can only be found when moving the observation plane in the same direction as that used for capturing FIG. 7b.

Therefore, a threshold can be set to easily identify the correct searching direction. After the correct searching direction has been determined, numerical iteration loops with a predefined searching range and with a predetermined length of the iteration steps are set in the procedural step (4). A typical searching range and a typical step length may be 20 $\mu$m and 0.5 $\mu$m, respectively. The calculations performing in an iteration loop will thus be terminated if an acceptable degree of deformation of the light contrast profile is found. Whether the degree of deformation is acceptable is obtained by a comparison between the absolute deviation $\Delta h_i$ of the h-values and two predefined threshold values $h_{c1}$ and $h_{c2}$. The values $h_{c1}$ and $h_{c2}$ are experimentally determined quantities indicating two typical types of deformations, called flatness and sparking respectively. The absolute deviation is calculated in the following way:

$$\Delta h_i = \sum_{k=i}^{i+p} |h_{k+1} - h_k|, \quad i = 1, 2, \ldots, N-p-1 \tag{10}$$

and it should fulfill the conditions $$\Delta h_i \geq h_{c1} \tag{11}$$

$$\Delta h_i \geq h_{c2} \tag{12}$$

where $\Delta h_{c1} \leq h_{c2}$. p is a number of steps smaller than N−1 for checking the degree of deformation and the preselected value thereof depends on the slope of the light contrast profile for the PM fiber of the type considered. Typically, p has a value in the range of 3–5. The procedural step (5) is again straight-forward according to the above discussion of the numerical fitting process.

It should be pointed out that the "auto-defocusing" process outlined above may not be necessary for PM fibers having a large variation range of their h-values, such as for Panda and Bowtie fibers. This results from the fact that the acceptable mismatch distances for such PM fibers are much larger, at least 2–3 times larger than for PM fibers having elliptical cores.

Figure 8:
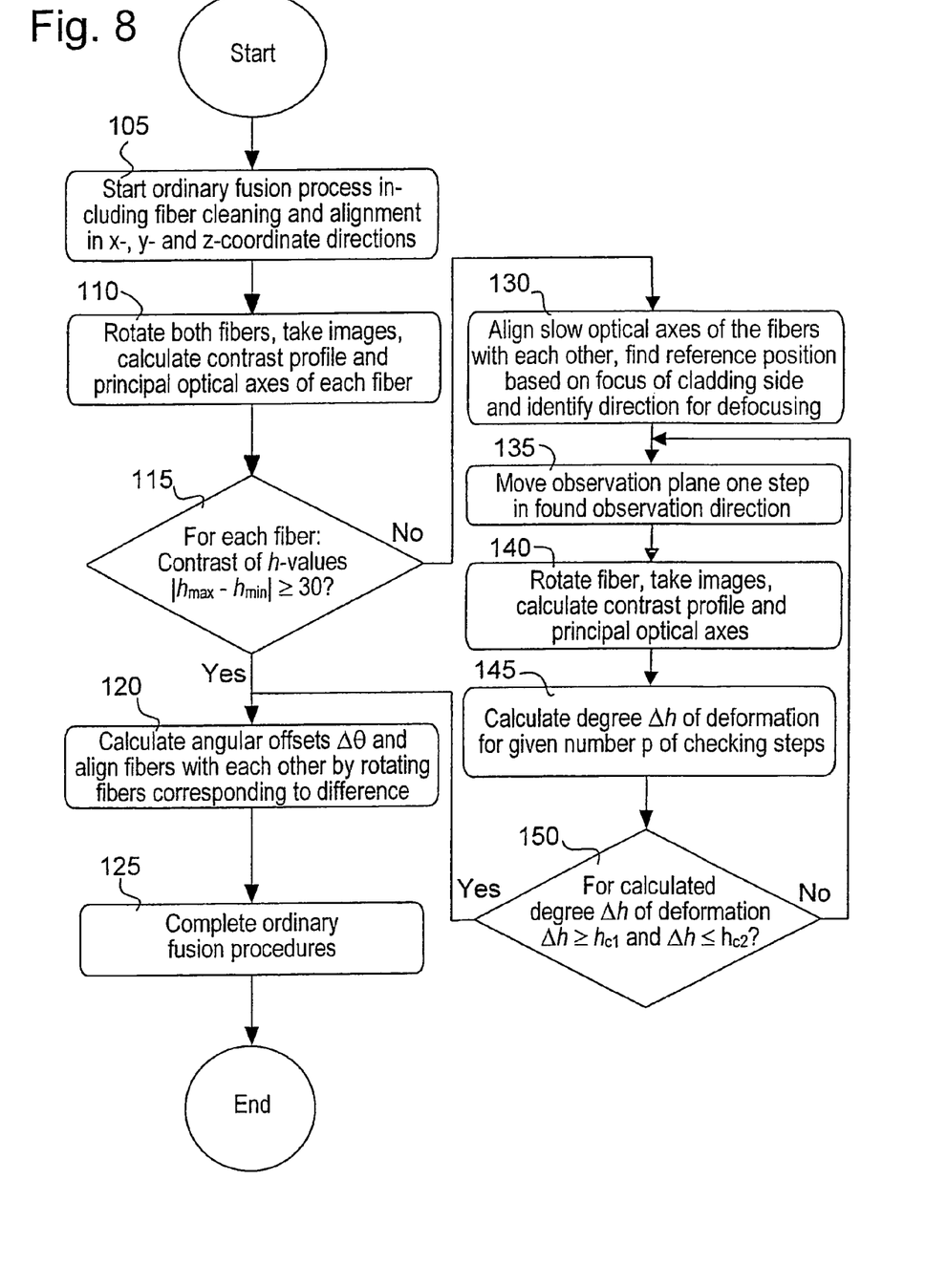
FIG. 8 is a program flow chart illustrating the method of alignment in fusion splicing with the aid of auto-defocusing.

Based on the concepts above, a simplified program flow chart comprising steps executed in the method of principal optical axis alignment that includes an auto-defocusing procedure is shown in FIG. 8. Referring to this chart and the block 105 therein, the ordinary fusion process starts by cleaning the PM fiber ends and then aligning them linearly, i.e. aligning the outer sides of their claddings or aligning them based on the sharp focusing at the center of fiber images, by moving the retainers 21 in the respective coordinate directions x, y, and z, see also FIGS. 1a and 1b. In the next step, block 110, the retained fiber ends are, by operating the rotary fixtures 22, simultaneously rotated to move in parallel as a single unit by suitable angular steps, e.g. over a full turn. For each angular step images are captured as imaged by the lens assemblies 7 and received by the TV cameras 9. Then, from the captured images, in the image processing and analysis unit 15 the light intensity distributions along suitably selected lines perpendicular to the longitudinal axes of the fiber images are determined and recorded. From the determined intensity distributions the contrast profiles, i.e. the h-values as functions of the rotation angle, are derived in the same unit 15 and curve fits are carried out as described above. Finally, from the fitted curves the angular positions of the slow and fast optical axes of the PM fiber ends are determined.

In the next block 115 the variation range of the h-values calculated for each of the two PM fiber ends is determined as the difference between the maximum and minimum of h, ($h_{max}-h_{min}$). and it is decided whether the determined range ($h_{max}-h_{min}$) for each of the two PM fibers is larger than or equal to some predetermined value, such as 30 in a standard automated splicing apparatus. If the range is decided to be larger than the predetermined value the auto-defocusing procedure is not necessary, and then in block 120 alignment of the polarization axes of the two PM fiber ends can be performed, by calculating the angular offset ΔΘ or difference in angular orientation of the slow optical axes of the PM fiber ends and then rotating the fiber ends with respect to each other by an angle corresponding to this difference. The ordinary fusion procedure is then carried out in the final block 125.

If in the block 115 the variation range of the h-values for either fiber is decided to be smaller than the predetermined value such as 30, a block 130 is executed, in which first the polarization axes of the two PM fiber ends are roughly angularly aligned with each other, by rotating the fiber ends in relation to each other as described above for block 120. Then, a reference position of the focusing setting of the imaging system is determined based on a sharp focusing either on the fiber cladding sides or on the longitudinal central part of images of the fiber ends, as discussed above. The direction in which to start the defocusing procedure is then found by moving the observation plane to a position closer to the imaging system 7 and to a position more distant of the imaging system, rotating the fiber ends to have their slow optical axes located approximately parallel to the optical axis of the imaging system and capturing images for each of the fibers, determining light intensity distributions along suitable lines as described above and evaluating the determined intensity distributions to find the position in which the intensity distribution has the steepest and sharpest edges. This position is taken to indicate the direction in which the observation plane should be moved to obtain an intensity distribution having the largest variation range. An iteration loop is then started in the next block 135 by moving the focus, i.e. the observation plane, from the reference position by one step having a predetermined length in the determined direction. In block 140, the PM fiber ends are simultaneously rotated stepwise, images are simultaneously taken for each step, light intensity distributions along lines are determined, the contrast profiles are calculated and the angular positions of the principal optical axes for each fiber end are determined, in a way similar to that described above for block 110. The steps are taken in an angular interval located symmetrically about the set angular position in which the slow optical axes are approximately parallel to the observation direction/optical axis of the imaging system. Thereafter, in block 145, the absolute deviation of the values of the now determined contrast profiles, i.e. the h-values, is investigated, while choosing the number of checking steps p=≦N−2 and calculating the absolute variations $$\Delta h_i = \sum_{k=i}^{i+p_1} |h_{k+1} - h_k|$$

for all integers i=1, 2, 3, . . . , N−p−1, such that the range when calculating the absolute variations includes the maximum and the minimum values of the light contrast profiles. In block 150 it is decided whether the two conditions are fulfilled, $\Delta h_i \geq h_{c1}$ and $\Delta h_i \leq h_{c2}$, for all i:s where $h_{c1}$ and $h_{c2}$ are the flatness and sparking criteria, respectively, as discussed above, and $h_{c1} \leq h_{c2}$. In the case where it is decided that the $\Delta h_i$ fulfill the conditions, which means that the auto-defocusing procedure has been successful, the process continues to the block 120, in which a final alignment of the polarization axes of the fibers is performed as described above.

If it is decided in the block 150 that the calculated absolute deviation $\Delta h_i$ does not fulfill the conditions, the auto-defocusing procedure continues by performing block 135 again, moving the observation plane by the same step in the same, determined direction of defocusing as has been described above.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of aligning the polarization axes of fiber ends of two optical polarization maintaining fibers with each other, the method comprising the successive steps of:
   placing the fiber ends at each other with longitudinal axes of the fiber ends aligned with each other;
   rotating the fiber ends in repeated angular steps around the longitudinal axes of the fiber ends to take successive angular positions, then for each angular step or angular position:
      capturing images of the fiber ends as seen in an observation plane;
      determining from each captured image a light intensity distribution along a line perpendicular to the longitudinal direction of each of the fiber ends; and
      determining from the determined light intensity distribution a contrast value h for each fiber end, resulting for each fiber end in a light contrast profile of h-values determined as a function of the angular position;
   determining from the light contrast profiles the angular positions of the polarization axes of the fiber ends; and
   rotating the fiber ends in relation to each other by an angle equal to the difference between the angular positions of the polarization axes of the fiber ends;
   wherein, in the step of capturing images of the fiber ends as seen in an observation plane, the observation plane is taken so that the variation ranges, i.e. the differences between maximum and the minimum values, of the resulting light contrast profiles obtain largest possible values.

2. The method according to claim 1, wherein when selecting the observation plane, focusing is first made on exterior cladding sides of the fiber ends, as seen in the observation direction, so that the observation plane in a reference position passes through the longitudinal axes of the fiber ends, or focusing is first made to obtain sharp images of areas of the images corresponding to central longitudinal areas of the images of the fiber ends, and that then the observation plane is moved a distance forwards or backwards from the reference position.

3. The method according to claim 1, wherein when selecting the observation plane, the following steps are performed:

moving the observation plane to a reference position where a sharp focus is obtained of exterior cladding sides of the fiber ends, seen in the observation direction, so that the observation plane in the reference position passes through the longitudinal axes of the fiber ends, or where focusing is such that sharp images of areas of the images corresponding to central longitudinal areas of the images of the fiber ends are obtained; and then, from the reference position, making an iterative search by moving the observation plane for determining the observation plane in which images of the fibers then are captured.

4. The method according to claim 3, wherein the step of making the iterative search comprises the steps of:

first, a direction for movement of the observation plane is determined, the direction being either forwards or backwards; and second, moving the observation plane in repeated steps of a predetermined first length from the reference position and in the determined direction of movement.

5. The method according to claim 4, wherein said step of determining the direction for movement comprises the step of moving the observation plane forwards and backwards from the reference position by a step of a second predetermined length and determining for each position the variation of the light contrast profile.

6. The method according to claim 3, wherein before the iterative search the fiber ends are rotated, using the determined angular positions, to reference angular positions in which their slow polarization axes are parallel to the observation direction and then for each step of the iterative search, first the fiber ends are rotated by repeated angular steps about the longitudinal axes to take angular positions within an interval centered around the reference positions, and the light contrast profiles are determined for the interval, the search stopped in the case where all the light contrast profiles have a suitable variation.

7. The method according to claim 6, wherein in determining the variation for the determined light contrast profiles of each fiber end, degrees of deformation are calculated according to $$\Delta h_i = \sum_{k=i}^{i+p} |h_{k+1} - h_k|,$$

$i=1, 2, \ldots, N-p-1$, where N is the number of angular positions within the interval, $p \leq N-2$ is a predetermined number of checking steps and $h_k$, $k=1, 2, \ldots, N$ are the determined light contrast values within the interval;

and wherein iterative search is stopped when all the degrees $\Delta h_i$ of deformation are within a prescribed range of values, i.e. $h_{c1} \leq \Delta h_i \leq h_{c2}$, where $h_{c1}$ and $h_{c2}$ are predetermined threshold values, for all values of i.

8. A device for aligning the polarization axes of fiber ends of two optical polarization maintaining fibers with each other, the device comprising:

two retainer means, each one arranged to hold an end of an optical fiber and adapted to displace and rotate the end a full turn about the longitudinal axis of the end;

control means connected to the two retainer means for controlling them to align the longitudinal axes of ends of optical fibers held by the retainer means and to move the ends into a close relationship at a splice position and then to rotate the ends;

a light source for illuminating by parallel light the ends at the splice position from a side of the ends;

a TV camera having a light sensitive surface and providing video signals;

a lens assembly having an optical axis for imaging the splice position taken in an observation plane onto the light sensitive surface, the TV camera thereby capturing images of the splice position;

processing and analysis means connected to the control means and to the TV camera for processing and analyzing video signals received from the TV camera;

the control means adapted to control the retainer means to rotate the fiber end in repeated angular steps around the longitudinal axis of the fiber end to take successive angular positions, and then for each angular position to control the processing and analyzing means to determine from the image captured in each angular position a light intensity distribution along a line perpendicular to the longitudinal direction of the fiber end and to determine from the determined light intensity distribution a contrast value h, this resulting for each fiber end in a light contrast profile of h-values determined as a function of the angular position;

the control means further adapted to control the processing and analyzing means to determine from the determined light contrast profiles the angular positions of the principal polarization axes of the fiber ends; and the control means further adapted to control the retainer means to rotate the fibers ends in relation to each other by an angle equal to the difference between the determined angular positions of the principals axes of the fiber ends, the control means are arranged to control the retainer means to move the fiber ends so to make the observation plane take a position so that the variation ranges of the determined light contrast profiles obtain largest possible values.

9. The device according to claim 8, wherein the processing and analyzing means comprise:

calculating means for calculating the variation ranges as the differences between maximum and minimum values of the determined light contrast profiles;

comparing means connected to the calculating means for comparing the variation ranges to a prescribed value; and decision means connected to the comparing means for deciding if the observation is to be moved to a new position.

* * * * *